(12) United States Patent
Ding et al.

(10) Patent No.: US 10,579,182 B2
(45) Date of Patent: Mar. 3, 2020

(54) DISPLAY SUBSTRATE, IN-CELL TOUCH SCREEN AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaoliang Ding, Beijing (CN); Xue Dong, Beijing (CN); Haisheng Wang, Beijing (CN); Xiaochuan Chen, Beijing (CN); Yingming Liu, Beijing (CN); Shengji Yang, Beijing (CN); Wei Liu, Beijing (CN); Pengpeng Wang, Beijing (CN); Changfeng Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/526,975

(22) PCT Filed: Jun. 3, 2016

(86) PCT No.: PCT/CN2016/084699
§ 371 (c)(1),
(2) Date: May 15, 2017

(87) PCT Pub. No.: WO2017/156889
PCT Pub. Date: Sep. 21, 2017

(65) Prior Publication Data
US 2018/0059848 A1     Mar. 1, 2018

(30) Foreign Application Priority Data
Mar. 15, 2016   (CN) .......................... 2016 1 0147600

(51) Int. Cl.
*G06F 3/041* (2006.01)
*G02F 1/1343* (2006.01)
(Continued)

(52) U.S. Cl.
CPC ........ *G06F 3/04144* (2019.05); *G06F 3/0412* (2013.01); *G06F 3/0414* (2013.01);
(Continued)

(58) Field of Classification Search
CPC ......... G06F 3/0412–0416; G06F 3/044; G06F 2203/04103; G06F 2203/04105; G06F 2203/04106
See application file for complete search history.

(56) References Cited

U.S. PATENT DOCUMENTS

2008/0100587 A1* 5/2008 Sano ................. G06F 3/041
345/173
2008/0129898 A1* 6/2008 Moon ................. G02F 1/13338
349/12

(Continued)

FOREIGN PATENT DOCUMENTS

CN          104220964 A      12/2014
CN          204557438 U       8/2015

(Continued)

OTHER PUBLICATIONS

First Office Action for Chinese Patent Application No. 201610147600.X dated Sep. 1, 2017.

(Continued)

*Primary Examiner* — David Tung
(74) *Attorney, Agent, or Firm* — Calfee, Halter & Griswold LLP

(57) ABSTRACT

A display substrate, an in-cell touch screen and a display device the field of touch technology are disclosed. The display substrate includes a TFT, a 2D touch electrode and (Continued)

a pressure-sensing electrode, and includes a first signal output wire for outputting electrical signal of the pressure-sensing electrode. A metallic layer forming a source/drain in the TFT is configured to act as the first signal output wire. The first signal output wire is electrically connected with the pressure-sensing electrode by a through-hole.

13 Claims, 3 Drawing Sheets

(51) Int. Cl.
*G02F 1/1333* (2006.01)
*G06F 3/044* (2006.01)

(52) U.S. Cl.
CPC ........ *G02F 1/1343* (2013.01); *G02F 1/13338* (2013.01); *G06F 3/044* (2013.01); *G06F 2203/04101* (2013.01); *G06F 2203/04103* (2013.01); *G06F 2203/04105* (2013.01)

(56) References Cited

U.S. PATENT DOCUMENTS

| | | |
|---|---|---|
| 2011/0291977 A1 | 12/2011 | Moriwaki |
| 2013/0285970 A1 | 10/2013 | Ahn et al. |
| 2014/0184559 A1* | 7/2014 | Han ..................... G06F 3/0412 345/174 |
| 2015/0070306 A1* | 3/2015 | Shinkai ................ G06F 1/1626 345/174 |
| 2015/0220181 A1 | 8/2015 | Jung |
| 2016/0253023 A1* | 9/2016 | Aoyama ............... G06F 3/0416 345/174 |
| 2017/0068368 A1* | 3/2017 | Hsiao ................... G06F 3/0416 |
| 2017/0115799 A1* | 4/2017 | Shih ..................... G06F 3/0412 |
| 2017/0249030 A1* | 8/2017 | Park ...................... G06F 3/044 |

FOREIGN PATENT DOCUMENTS

| | | |
|---|---|---|
| CN | 204833200 U | 12/2015 |
| CN | 204965385 U | 1/2016 |
| CN | 204990228 U | 1/2016 |
| KR | 20100004324 A | 1/2010 |

OTHER PUBLICATIONS

Search Report for International Application No. PCT/CN2016/084699 dated Dec. 14, 2016.

* cited by examiner

DISPLAY SUBSTRATE, IN-CELL TOUCH SCREEN AND DISPLAY DEVICE

RELATED APPLICATIONS

The present application is the U.S. national phase entry of PCT/CN2016/084699 with an International filing date of Jun. 3, 2016, which claims the benefit of Chinese Application No. 201610147600.X, filed on Mar. 15, 2016, the entire disclosures of which are incorporated herein by reference.

TECHNICAL FIELD

The present disclosure relates to the field of touch technology, and more particularly to a display substrate, an in-cell touch screen and a display device.

BACKGROUND ART

At present, the touch technology has become an indispensable part of mobile phone applications. The existing touch technology used for liquid crystal display (LCD) panels is mostly of a two-dimensional (2D) structure, wherein users interact with screens of mobile phones through operation on the 2D plane in the XY direction.

With the diversification and intelligentization of mobile phone functions, the three-dimensional (3D) touch is a tendency of development in the future. In comparison with the 2D touch, the users of which can only conduct operation of X and Y positions on the LCD panels without knowing the force pressed by the users' finger, the 3D touch can convey the Z position, the depth pressed down by the user's finger, to the mobile phone so that the mobile phone can make a corresponding response, thereby rendering the LCD panel more intelligent.

As the LCD panels can be operated intelligently in X, Y and Z directions simultaneously, however, the problem of overlarge load will occur inevitably. The increase in the number of sensors leads to excessive resistance and overlarge load, so that the users feel less comfortable with the use of LCD panels, which affects the application of the 3D touch technology in the market. Therefore, it is very important to design a 3D touch LCD display panel with low load.

SUMMARY

The present disclosure provides a display substrate, an in-cell touch screen and a display device. The display substrate realizes the 3D touch with low load by decreasing wire resistance, and enhances the user experience.

In a first aspect of the present disclosure, there is provided a display substrate comprising a TFT (thin film transistor), a 2D touch electrode and a pressure-sensing electrode, and comprising a first signal output wire for outputting electrical signal of the pressure-sensing electrode, wherein at least a part of a metallic layer forming a source/drain in the TFT is configured to act as the first signal output wire, and the first signal output wire is electrically connected with the pressure-sensing electrode by a through-hole.

In the display substrate, an extended surface of the display substrate is set to be the plane where the X axis and the Y axis in the coordinates lie. A touch drive module of the display substrate can judge the touch operation made by a user on the X axis and the Y axis by the 2D touch electrode and judge the touch operation made by the user on the Z axis by the pressure-sensing electrode, thereby achieving a 3D touch. In the display substrate, the pressure-sensing electrode is electrically connected by a through-hole with the first signal output wire which at least a part of the source/drain metallic layer is configured to act as so as to further transmit, to the touch drive module, the signal generated by the pressure-sensing electrode when depressed. Since the resistivity of the source/drain metallic layer is far less than the resistivity of the pressure-sensing electrode, the resistance of the first signal output wire which at least a part of the source/drain metallic layer is configured to act as is greatly decreased, which thereby reduces the load of the touch drive module and shortens the response time to the user's operation.

Thus, the display substrate realizes 3D touch with low load by means of decreasing the wire resistance, and enhancing user experience.

In some embodiments, the display substrate further comprises a base substrate and a light shielding metallic layer, the light shielding metallic layer and the TFT are ordinally disposed on the base substrate, and at least a part of the light shielding metallic layer is configured to act as the pressure-sensing electrode.

In some embodiments, the display substrate further comprises a common electrode layer disposed on the TFT, and at least a part of the common electrode layer is configured to act as the 2D touch electrode.

In the above embodiment, by means of forming the pressure-sending electrode and the light shielding metallic layer on the same layer and/or forming the 2D touch electrode and the common electrode layer on the same layer, the 3D touch can be realized without obviously increasing the thickness of the display substrate, which is advantageous to the lightweight and thinness of the 3D touch display substrate.

In some embodiments, the display substrate further comprises a second signal output wire for outputting electrical signal of the 2D touch electrode, wherein at least a part of a metallic layer forming a source/drain in the TFT is configured to act as the second signal output wire, and the second signal output wire is electrically connected with the 2D touch electrode by a through-hole.

In some embodiments, the orthography of the through-hole which connects the first signal output wire with the pressure-sensing electrode and the orthography of the through-hole which connects the second signal output wire with the 2D touch electrode do not coincide on the base substrate.

In some embodiments, the display substrate further comprises a gate line, wherein at least a part of a metallic layer (also known as a gate metallic layer herein) forming a gate of the TFT is configured to act as the gate line, the pressure-sensing electrode has a first electrode line aligned with the first signal output wire and a second electrode line aligned with the gate line which at least a part of the gate metallic layer is configured to act as, the first electrode line and other first electrode lines are parallel to each other, the second electrode line and other second electrode lines are parallel to each other, and the first electrode lines and second electrode lines mutually interweave to form a grid-like structure.

In some embodiments, in the pressure-sensing electrode having a grid-like structure, each of the first electrode lines intersects with each of the second electrode lines to form a node, and each of first signal output wires is electrically connected with the node on the aligned first electrode line by a through-hole.

In some embodiments, the openings in the grid-like structure of the pressure-sensing electrode correspond to pixel units of the display substrate in a one-to-one relationship.

In some embodiments, at least a part of the metallic layer (also known as the source/drain metallic layer herein) forming the source/drain is also configured to act as a data line, and the first signal output wire is parallel to the data line.

In some embodiments, the TFT comprises an active layer, a gate insulating layer, the gate metallic layer, an interlayer insulating layer and the source/drain metallic layer ordinally formed on the base substrate, and a buffer layer is disposed between the active layer and the light shielding metallic layer.

In a second aspect of the present disclosure, there is provided an in-cell touch screen comprising any display substrate provided by the above technical solutions.

In a third aspect of the present disclosure, there is provided a display device comprising the in-cell touch screen provided by the above technical solution.

BRIEF DESCRIPTION OF DRAWINGS

FIGS. 6 and 7 are respectively a partial cross-sectional view of the display substrate provided by an embodiment of the present disclosure, wherein FIG. 6 is a cross-sectional view taken along the line A-A' in FIG. 7.

DETAILED DESCRIPTION OF THE DISCLOSURE

The technical solutions of the embodiments of the present disclosure will be explained clearly and completely below with reference to the drawings of the embodiments of the present disclosure. Apparently, the embodiments described are only a part of the embodiments, not the whole, of the present disclosure. Based on the embodiments in the present disclosure, those ordinarily skilled in the art will obtain other embodiments without making inventive effort, all of which fall within the scope of protection of the present disclosure.

Figure 1:
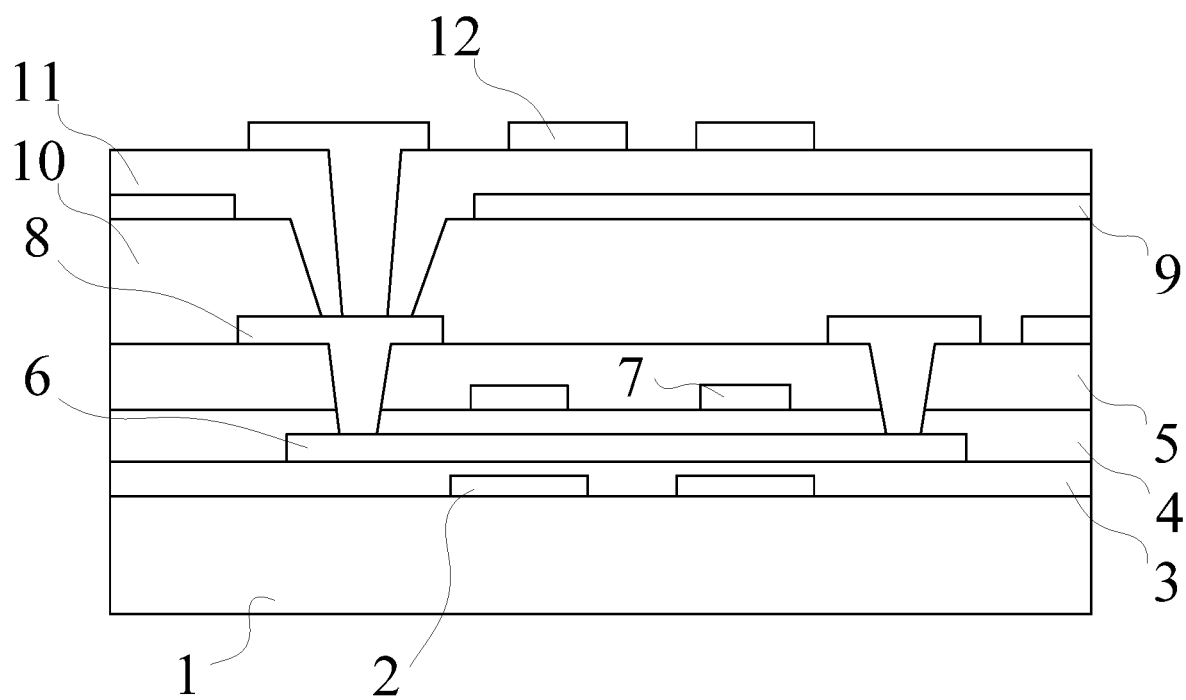
FIG. 1 is a structural schematic view of a display substrate provided by an embodiment of the present disclosure.

As shown in FIG. 1, a display substrate comprises a base substrate 1, and a light shielding metallic layer 2, a TFT, a common electrode layer 9, a pixel electrode layer 12 ordinally formed on the base substrate 1, and an insulating layer 11 sandwiched between the common electrode layer 9 and the pixel electrode layer 12. The TFT comprises an active layer 6, a gate insulating layer 4, a gate metallic layer 7, an interlayer insulating layer 5 and a source/drain metallic layer 8 ordinally formed on the base substrate 1. The light shielding metallic layer 2 is used to prevent the effect of the light generated by a light source under the display substrate on the gate of the TFT. A buffer layer 3 is disposed between the active layer 6 and the light shielding metallic layer 2 so as to prevent the elements in the light shielding metallic layer 2 from diffusing into the active layer 6, thereby affecting the performance of the display substrate. Additionally, a flat layer 10 is disposed between the common electrode layer 9 and the source/drain metallic layer 8.

Figure 2:
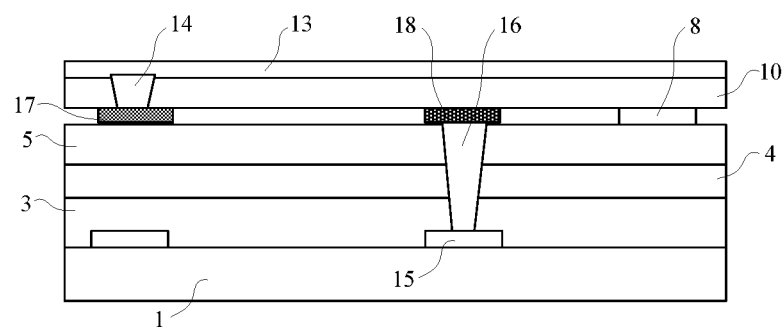
FIG. 2 is a partial cross-sectional schematic view of the display substrate provided by an embodiment of the present disclosure.

As shown in FIG. 2, the display substrate also comprises a 2D touch electrode 13 and a pressure-sensing electrode 15, wherein at least a part of the common electrode layer 9 (FIG. 1) is configured to act as the 2D touch electrode 13, and at least a part of the light shielding metallic layer 2 (FIG. 1) is configured to act as the pressure-sensing electrode 15. The display substrate further comprises a first signal output wire 18 for outputting electrical signals of the pressure-sensing electrode 15, at least a part of a metallic layer 8 (a source/drain metallic layer 8, FIG. 1) forming a source/drain in the TFT is configured to act as the first signal output wire 18, and the first signal output wire 18 is electrically connected with the pressure-sensing electrode 15 by a through-hole 16.

In the above display substrate, an extended surface of the display substrate is set to be the plane where the X axis and the Y axis in the coordinates lie, a touch drive module of the display substrate can judge the touch operation made by users in the directions of the X axis and the Y axis by the 2D touch electrode 13 and judge the touch operation made by users in the direction of the Z axis by the pressure-sensing electrode 15, thereby achieving a 3D touch. In the display substrate, the pressure-sensing electrode 15 which at least a part of the light shielding metallic layer 2 is configured to act as is electrically connected by a through-hole 16 with the first signal output wire 18 which at least a part of the source/drain metallic layer 8 is configured to act as so as to further transmit, to the touch drive module, the signals generated by the pressure-sensing electrode 15 when depressed. Since the resistivity of the source/drain metallic layer 8 is far less than the resistivity of the light shielding metallic layer 2, the resistance of the first signal output wire 18 which at least a part of the source/drain metallic layer 8 is configured to act as is greatly decreased, which thereby reduces the load of the touch drive module and shortens the response time to users' operation.

Thus, the display substrate realizes 3D touch with low load by means of decreasing the wire resistance, and enhancing user experience.

Figure 3:
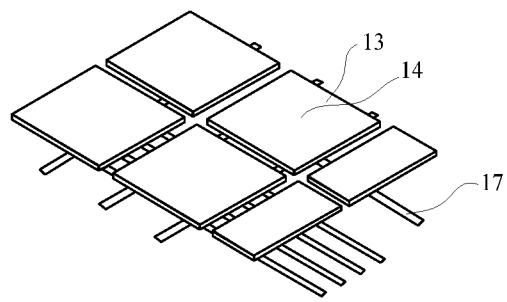
FIG. 3 is a schematic view of a 2D touch electrode in the display substrate provided by an embodiment of the present disclosure.

To further decrease the load of the touch drive module on the basis of the above display substrate, as shown in FIGS. 2 and 3, the display substrate further comprises a second signal output wire 17 for outputting electrical signals of the 2D touch electrode 13, wherein at least a part of the source/drain metallic layer 8 is configured to act as the second signal output wire 17, and the second signal output wire 17 is electrically connected with the 2D touch electrode 13 by a through-hole 14. The through-hole 14 connects conductively the second signal output wire 17 and the 2D touch electrode 13. The 2D touch electrode 13 is led to the touch drive module by the second signal output wire 17, thereby transmitting the signals sensed by the 2D touch electrode to the touch drive module. Since the resistivity of the source/drain metallic layer 8 is smaller, the resistance of the second signal output wire 17 which at least a part of the source/drain metallic layer 8 is configured to act as is smaller, thereby the load of the touch drive module connected with the 2D touch electrode 13 is decreased.

It shall be pointed out that although FIG. 2 schematically illustrates a single 2D touch electrode 13, a single pressure-sensing electrode 15, a single through-hole 14 and a second signal output wire 17 corresponding to the single 2D touch electrode 13, and a single through-hole 16 and a first signal output wire 18 corresponding to the single pressure-sensing electrode 15, FIG. 2 only illustrates the display substrate in part. As will be understood by those skilled in the art, the display substrate may comprise a plurality of 2D touch electrodes 13, a plurality of pressure-sensing electrodes 15 as well as a plurality of corresponding through-holes 14, 16 and the first and second signal output wires 17, 18, as needed.

Figure 4:
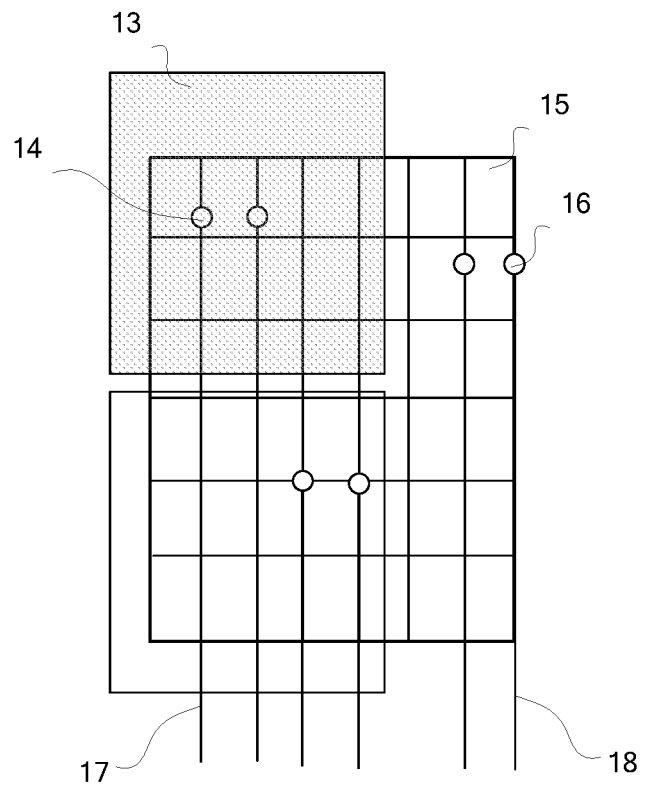
FIG. 4 is a schematic view illustrating the position of a through-hole in the display substrate provided by an embodiment of the present disclosure.

On the basis of the above display substrate, to guarantee the stability of the 2D touch electrode 13 and the pressure-sensing electrode 15 in operation, to be specific, as shown in FIGS. 2 and 4, the orthography of the through-hole 16 which connects the first signal output wire 18 with the pressure-sensing electrode 15 and the orthography of the through-hole 14 which connects the second signal output wire 17 with the 2D touch electrode 13 do not coincide on the base substrate 1 (such a positional relationship as non-coincidence of orthography is also called "unaligned" arrangement herein). Since at least a part of the source/drain metallic layer 8 are configured to act as both the first signal output wire 18 and the second signal output wire 17, the unaligned arrangement between the through-hole 16 and the second through-hole 14 can prevent the conductive connection between the first signal output wire 18 and the second signal output wire 17 which lie in the same layer, thereby guaranteeing the stability and security of the 2D touch electrode 13 and the pressure-sensing electrode 15 in operation.

Figure 5:
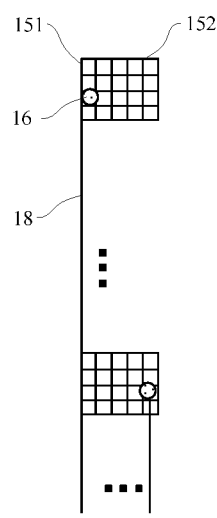
FIG. 5 is a schematic view illustrating the grid-like structure of a pressure-sending electrode in the display substrate provided by an embodiment of the present disclosure.

FIG. 5 is a schematic view illustrating the grid-like structure of the pressure-sending electrodes according to an embodiment of the present disclosure. As shown in FIG. 5, the pressure-sensing electrodes 15 have first electrode lines 151 aligned with the first signal output wires 18 and second electrode lines 152 aligned with the gate lines which at least a part of the gate metallic layer is configured to act as, the first electrode lines 151 are parallel to each other, the second electrode lines 152 are parallel to each other, and the first electrode lines 151 and second electrode lines 152 mutually interweave to form a grid-like structure. On the basis of the 2D touch electrodes 13 for detecting the user's operation in the XY direction, the pressure-sensing electrodes 15 as formed comprise two parts, wherein a plurality of parallel first electrode lines 151 aligned with the first signal output wires serve as a longitudinal graph, and a plurality of parallel second electrode lines 152 aligned with the gate lines which at least a part of the gate metallic layer is configured to act as serve as a horizontal graph. The grid formed of the interwoven first electrode lines 151 and second electrode lines 152, which serves as a sensing graph, enables the pressure-sensing electrode 15 to detect the users' operation in the Z direction. It should be pointed out that FIG. 5 schematically illustrates one first signal output wire 18. In fact, since the first electrode line 151 of the pressure-sensing electrode 15 is aligned with the first signal output wire 18, it is only possible to see, in the top view as shown in FIG. 5, one of the first electrode line 151 and the first signal output wire 18, and the other is blocked due to alignment. For similar reasons, FIG. 5 does not illustrate the gate lines because the gate lines are aligned with the second electrode lines 152 of the pressure-sensing electrodes 15. Thus, it is only possible to see, in the top view as shown in FIG. 5, one of the second electrode lines 151 and the gate lines (the second electrode lines 152 in this embodiment), and the other (the gate lines in this embodiment) is blocked due to alignment.

Figure 6:
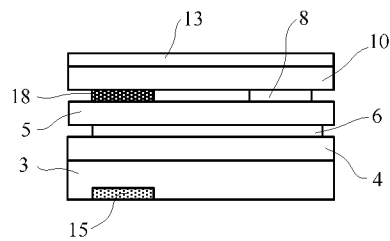
Figure 7:
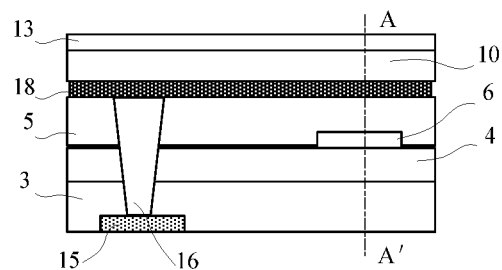

FIGS. 6 and 7 further show, in detail, a partial cross-sectional view of the display substrate provided by an embodiment of the present disclosure, wherein FIG. 6 is a cross-sectional view taken along the line A-A' in FIG. 7.

Figure 8:
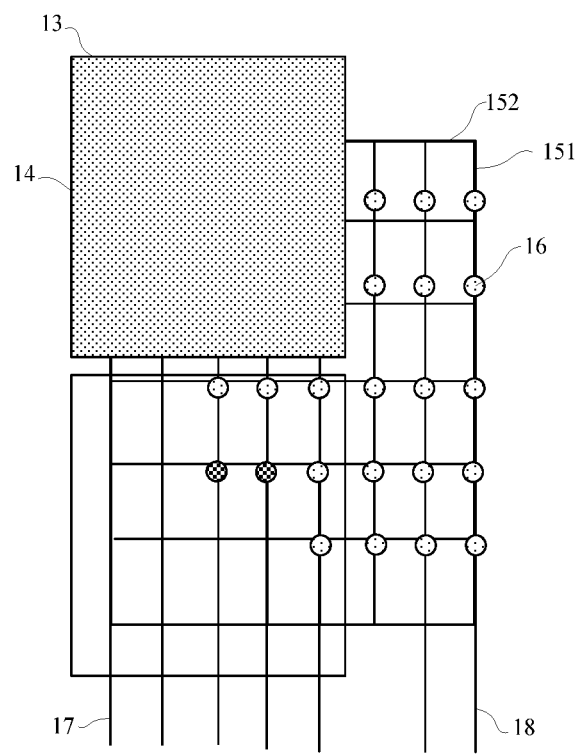
FIG. 8 is a schematic view illustrating the position of a through-hole in the display substrate provided by an embodiment of the present disclosure.

On the basis of the pressure-sensing electrode 15, in order to further decrease the resistance of the pressure-sensing electrode 15 so as to reduce the load of the touch drive module, as shown in FIG. 8, in the pressure-sensing electrode 15 having a grid-like structure, each of the first electrode lines 151 intersects with each of the second electrode lines 152 to form a node, and each of the first signal output wires 18 is electrically connected with the corresponding node by a through-hole 16. The pressure-sensing electrode 15 having a grid-like structure is divided into small portions by the nodes, and is connected with the first signal output wires 18 by the through-hole 16 and led to the touch drive module. The resistance of each portion comprises a wire resistance and the resistance of each portion of the pressure-sensing electrode 15, all the portions are connected in parallel such that the resistance of the entire pressure-sensing electrode 15 is greatly reduced, and the load of the touch drive module is greatly decreased.

To be specific, the openings in the grid-like structure of the pressure-sensing electrode 15 correspond to pixel units of the display substrate in a one-to-one relationship. The pressure-sensing electrode 15 is formed in pixels, and the openings in the grid-like structure of the pressure-sensing electrode 15 correspond to pixel units of the display substrate in a one-to-one relationship so as to increase the reaction sensitivity of the pressure-sensing electrode 15, thereby enhancing user experience.

The wires in the display substrate are arranged in a dual source manner, at least a part of the source/drain metallic layer 8 is also configured to act as data lines, and the first signal output wires 18 are parallel to the data lines.

The embodiment of the present disclosure also provides an in-cell touch screen comprising any display substrate provided by the above technical solutions. Since the display substrate can realize the 3D touch with low load and enhance user experience, the in-cell touch screen having the display substrate may also have good user experience.

The embodiment of the present disclosure also provides a display device comprising the in-cell touch screen provided by the above technical solution. The in-cell touch screen having the display substrate has good user experience, so that the display device comprising the in-cell touch screen has good user experience.

Apparently, those skilled in the art can make any variations and modifications to the embodiments of the present disclosure without departing from the spirit and scope of the present disclosure. Thus, if the variations and modifications of the present disclosure fall within the scope of the appended claims and equivalents thereof, the present disclosure is also intended to include these variations and modifications.

The invention claimed is:

1. A display substrate comprising: a base substrate, and a light shielding metallic layer, TFTs, a common electrode layer ordinally formed on the base substrate, the display substrate further comprising a plurality of 2D touch electrodes by which a touch position is judged and a plurality of pressure-sensing electrodes by which a touch pressure is judged, wherein at least a part of the common electrode layer on the TFTs is configured to act as the 2D touch electrodes, and at least a part of the light shielding metallic layer under the TFTs is configured to act as the pressure-sensing electrodes, and the display substrate further comprising first signal output wires for outputting electrical signals of the pressure-sensing electrodes and second signal output wires for outputting electrical signals of the 2D touch electrodes, wherein at least a part of a metallic layer forming sources/drains in the TFTs is configured to act as the second signal output wires, and the second signal output wires are electrically connected with the 2D touch electrodes by a plurality of through-holes, wherein at least a part of the metallic layer forming sources/drains in the TFTs is configured to act as the first signal output wires, and the first signal output wires are electrically connected with the pressure-sensing electrodes by a plurality of through-holes, and a resistance of the metallic layer is less than that of the pressure-sensing electrodes.

2. The display substrate according to claim 1, wherein the orthographies of the through-holes which connect the first signal output wires with the pressure-sensing electrodes and the orthographies of the through-holes which connect the second signal output wires with the 2D touch electrodes do not coincide on the base substrate.

3. The display substrate according to claim 1, further comprising gate lines which at least a part of a metallic layer forming gates of the TFTs is configured to act as, each of the pressure-sensing electrodes has first electrode lines aligned with the first signal output wires and second electrode lines aligned with the gate line, the first electrode line and other first electrode lines are parallel to each other, the second electrode line and other second electrode lines are parallel to each other, and the first electrode lines and second electrode lines mutually interweave to form a grid-like structure.

4. The display substrate according to claim 3, wherein in each pressure-sensing electrode having a grid-like structure, each of the first electrode lines intersects with each of the second electrode lines to form a node, and each of the first signal output wires is electrically connected with nodes on the aligned first electrode line by through-holes.

5. The display substrate according to claim 3, wherein the openings in the grid-like structure of the pressure-sensing electrode correspond to pixel units of the display substrate in a one-to-one relationship.

6. The display substrate according to claim 1, wherein at least a part of the metallic layer forming the sources/drains is also configured to act as data lines, and the first signal output wires are parallel to the data lines.

7. The display substrate according to claim 1, wherein the TFT comprises an active layer, a gate insulating layer, the gate metallic layer, an interlayer insulating layer and the source/drain metallic layer ordinally formed on the base substrate, and a buffer layer is disposed between the active layer and the light shielding metallic layer.

8. An in-cell touch screen comprising a display substrate, wherein the display substrate comprises a base substrate, and a light shielding metallic layer, TFTs, a common electrode layer ordinally formed on the base substrate, the display substrate further comprising a plurality of 2D touch electrodes by which a touch position is judged and a plurality of pressure-sensing electrodes by which a touch pressure is judged, wherein at least a part of the common electrode layer on the TFTs is configured to act as the 2D touch electrodes, and at least a part of the light shielding metallic layer under the TFTs is configured to act as the pressure-sensing electrodes, and the display substrate further comprising first signal output wires for outputting electrical signals of the pressure-sensing electrodes and second signal output wires for outputting electrical signals of the 2D touch electrodes, wherein at least a part of a metallic layer forming sources/drains in the TFTs is configured to act as the second signal output wires, and the second signal output wires are electrically connected with the 2D touch electrodes by through-holes, wherein at least a part of the metallic layer forming in the TFTs is configured to act as the first signal output wires, and the first signal output wires are electrically connected with the pressure-sensing electrodes by through-holes, and a resistance of the metallic layer is less than that of the pressure-sensing electrode.

9. The in-cell touch screen according to claim 8, wherein the display substrate further comprises gate lines which at least a part of a metallic layer forming gates of the TFTs is configured to act as, each of the pressure-sensing electrodes has first electrode lines aligned with the first signal output wires and second electrode lines aligned with the gate line, the first electrode line and other first electrode lines are parallel to each other, the second electrode line and other second electrode lines are parallel to each other, and the first electrode lines and second electrode lines mutually interweave to form a grid-like structure.

10. The in-cell touch screen according to claim 9, wherein in each pressure-sensing electrode having a grid-like structure, each of the first electrode lines intersects with each of the second electrode lines to form a node, and each of the first signal output wires is electrically connected with nodes on the aligned first electrode line by through-holes.

11. A display device comprising an in-cell touch screen, wherein the in-cell touch screen comprises a display substrate, wherein the display substrate comprises a base substrate, and a light shielding metallic layer, a TFT, a common electrode layer ordinally formed on the base substrate, the display substrate further comprising a 2D touch electrode by which a touch position is judged and a pressure-sensing electrode by which a touch pressure is judged, wherein at least a part of the common electrode layer on the TFT is configured to act as the 2D touch electrode, and at least a part of the light shielding metallic layer under the TFT is configured to act as the pressure-sensing electrode, and the display substrate further comprising first signal output wires for outputting electrical signals of the pressure-sensing electrodes and second signal output wires for outputting electrical signals of the 2D touch electrodes, wherein at least a part of a metallic layer forming sources/drains in the TFTs is configured to act as the second signal output wires, and the second signal output wires are electrically connected with the 2D touch electrodes by through-holes, wherein at least a part of the metallic layer forming sources/drains in the TFTs is configured to act as the first signal output wires, and the first signal output wires are electrically connected with the pressure-sensing electrodes by through-holes, and a resistance of the metallic layer is less than that of the pressure-sensing electrode.

12. The display device according to claim 11, wherein the display substrate further comprises gate lines which at least a part of a metallic layer forming gates of the TFTs is configured to act as, each of the pressure-sensing electrodes has first electrode lines aligned with the first signal output wires and second electrode lines aligned with the gate line, the first electrode line and other first electrode lines are parallel to each other, the second electrode line and other second electrode lines are parallel to each other, and the first electrode lines and second electrode lines mutually interweave to form a grid-like structure.

13. The display device according to claim 12, wherein in each pressure-sensing electrode having a grid-like structure, each of the first electrode lines intersects with each of the second electrode lines to form a node, and each of the first signal output wires is electrically connected with nodes on the aligned first electrode line by through-holes.

* * * * *